(12) United States Patent
Yamada

(10) Patent No.: US 7,262,767 B2
(45) Date of Patent: Aug. 28, 2007

(54) PSEUDO 3D IMAGE CREATION DEVICE, PSEUDO 3D IMAGE CREATION METHOD, AND PSEUDO 3D IMAGE DISPLAY SYSTEM

(75) Inventor: Kunio Yamada, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 64 days.

(21) Appl. No.: 11/176,200

(22) Filed: Jul. 8, 2005

(65) Prior Publication Data

US 2006/0061569 A1    Mar. 23, 2006

(30) Foreign Application Priority Data

Sep. 21, 2004  (JP) ............................ P2004-273040

(51) Int. Cl.
*G06T 17/00*    (2006.01)
(52) U.S. Cl. .................................................... 345/419
(58) Field of Classification Search ................ 345/419
See application file for complete search history.

(56) References Cited

FOREIGN PATENT DOCUMENTS

| JP | 07/222201 | 8/1995 |
|---|---|---|
| JP | 07/296185 | 11/1995 |
| JP | 09/185712 | 7/1997 |
| JP | 2005-151534 | 6/2005 |
| WO | 98/29850 A1 | 7/1998 |

OTHER PUBLICATIONS

Kontsevich, "The inference of three-dimensional structure from weak perspective projections based on pairwise comparisons of images", 1992, SPIE, pp. 51-60.*
Horry, Y., et al., "Tour Into The Picture: Using A Spidery Mesh Interface To Make Animation From A Single Image", *SIGGRAPH' 97 Proceedings*, pp. 225-232, (1997).
Tomasi, C., et al., "Shape And Motion From Image Streams: A Factorization Method: Full Report On The Orthographic Case", *Int. Journal Of Computer Vision*, (1992).
Yamada, K., et al., "Disocclusion Based On The Texture Statistics Of The Image Segmented By The Region Competition Algorithm", *Journal Of The Institute Of Image Information And Television Engineers*, vol. 56, No. 5, pp. 863-866, (2002).

* cited by examiner

*Primary Examiner*—Almis R. Jankus
(74) *Attorney, Agent, or Firm*—The Nath Law Group; Jerald L. Meyer; Derek Richmond

(57) ABSTRACT

To allow any image to be viewed naturally and to determine a scene structure as close to a real object as possible, frame memories store therein three types of basic depth models indicating the depth values of three basic types of scene structures, one basic depth model for each scene structure. A composition ratio is determined according to the high frequency component estimation values or activity values of the luminance signal of a received non-3D image that are received from a top activity unit and a bottom activity unit and, based on the composition ratio, the three types of basic depth models are composed. The R signal of the non-3D image is superimposed on the composed basic depth model in an adder to produce final depth estimation data.

6 Claims, 11 Drawing Sheets

PSEUDO 3D IMAGE CREATION DEVICE, PSEUDO 3D IMAGE CREATION METHOD, AND PSEUDO 3D IMAGE DISPLAY SYSTEM

BACKGROUND OF THE INVENTION

1. Field of the Invention

The present invention relates to a pseudo 3D image creation device, a pseudo 3D image creation method, and a pseudo 3D image display system. More particularly, the present invention relates to a pseudo 3D image creation device and a pseudo 3D image creation method for creating a pseudo 3D image from a regular still image or moving image, that is, an image (a non-3D image) having depth information supplied neither explicitly nor, unlike a stereo image, implicitly, and to a pseudo 3D image display system that displays a created pseudo 3D image.

2. Description of the Related Art

To allow a non-3D image to be viewed as a 3D image in a 3D display system, a pseudo 3D image is created from a regular still image or moving image, that is, an image (a non-3D image) having depth information supplied neither explicitly nor, unlike a stereo image, implicitly. In addition to making an image to be viewed as a 3D image, many approaches are now under research and investigation to estimate the three-dimensional structure of a scene from a two dimensional image for composing an image or carrying out virtual viewpoint movement (for example, see Y. Horry, K. Anjyo, K. Arai: "Tour Into the Picture: Using a Spidery Mesh Interface to Make Animation from a Single Image", SIGGRAPH' 97 Proceedings, pp. 225–232 (1997)). The method called "Tour Into the Picture" described in this document allows the user to remove foreground objects from a photographed image, to specify a vanishing point in the perspective and, based on the specified vanishing point, to estimate the general configuration of a scene for carrying out viewpoint movement.

In contrast to the "Tour Into the Picture" described above in which the depth structure has a tube-like shape whose cross section is a rectangle, a pseudo 3D image creation device and a pseudo 3D image creation method using a perspective-based approach, in which the depth structure has a tube shape whose cross section is a border line according to the depth, are also conventionally known (for example, see Japanese Patent Laid-Open Publication No. Hei9(1997)-185712). According to the invention described in Japanese Patent Laid-Open Publication No. Hei9(1997)-185712, border line distance information is added to mesh image data to produce three-dimensional polygon 3D data and, by applying color image data, obtained from photograph images, to this three-dimensional polygon 3D data, the three-dimensional polygon 3D object composed of the three-dimensional polygon 3D data is rendered such that the color image data is pasted on the inside of the three-dimensional polygon 3D object, thereby to produce three-dimensional image data.

As a classical way to convert a two-dimensional image to a three-dimensional image, the so-called "shape from motion" is known (for example, see C. Tomasi and T. Kanada: "Shape and Motion from Image Streams under Orthography: A Factorization Method", Int. Journal of Computer Vision. Vo). As its name implies, this method estimates a depth from motion information and configures a 3D image using the motion information on a moving image. However, because it is difficult to automatically estimate a reliable depth without editing and only from the motion, a pseudo 3D image creation device and a pseudo 3D image creation method for making this editing easy are also known (for example, see Japanese Patent Laid-Open Publication No. Hei7(1997)-222201). Japanese Patent Laid-Open Publication No. Hei7(1997)-222201 discloses a conversion method for converting a two-dimensional image to a three-dimensional image. According to this method, an original two-dimensional image is divided into a plurality of scenes and then, depending upon whether each scene is to be used directly as a two-dimensional image or to be converted to a three-dimensional image, the conversion ratio of a three-dimensional image, which will be generated from the two-dimensional image, to the two-dimensional image is adjusted.

However, there are problems with the conventional pseudo 3D image creation devices and the pseudo 3D image creation methods described above in that it is difficult to automatically determine a vanishing point for various images, in that perspective structure estimation is not always suitable for all received scenes, and in that, even if perspective structure estimation is suitable, it is difficult to automatically compose a correct depth structure model for making the image to be viewed naturally as a 3D object.

Another problem with the method ("shape from motion") described in C. Tomasi and T. Kanada: "Shape and Motion from Image Streams under Orthography: A Factorization Method", Int. Journal of Computer Vision. Vo is that it is difficult to automatically estimate the depth reliably as described above and, fundamentally, creating a 3D object is impossible for a still image or a relatively-stopped part. In addition, it is difficult to perform processing, which involves motion estimation, at a high speed and this problem tends to prevent an image from being processed in real time.

SUMMARY OF THE INVENTION

In view of the foregoing, it is an object of the present invention to provide a pseudo 3D image creation device and a pseudo 3D image creation method, which create a pseudo 3D image from a non-3D image, and a pseudo 3D image display system that displays a pseudo 3D image. Unlike the so-called "shape from motion" method that performs depth estimation using motion information, the device and the method according to the present invention estimate the basic depth structure of a scene from the image content of a still image to such a degree that "the scene structure of a type is to be selected because it is relatively similar to the real scene based on the rules of thumb". Even if the judgment is wrong, the device and the method employ a depth structure that does not make a viewer feel extremely odd, based on the so-called failsafe concept.

It is another object of the present invention to provide a pseudo 3D image creation device and a pseudo 3D image creation method for simplifying the pseudo 3D image creation algorithm to increase the processing speed.

To achieve the above object, there is provided a pseudo 3D (three-dimensional) image creation device that creates depth estimation data from a non-3D image having depth information supplied neither explicitly nor, unlike a stereo image, implicitly for creating a pseudo 3D image from the depth estimation data and the non-3D image, the pseudo 3D image creation device comprising: a generating unit that generates a plurality of basic depth models indicating depth values of a plurality of basic scene structures, one for each; a calculation unit that calculates a statistical amount of pixel values in a predetermined area on a screen of the non-3D image, which is supplied, to estimate a scene structure; a composition unit that composes the plurality of basic depth models, which are generated by the generating unit, according to a composition ratio corresponding to a value calculated by the calculation unit; and a creation unit that creates the depth estimation data from the composition result composed by the composition unit and the supplied non-3D image.

In a preferred embodiment of the present invention, the calculation unit calculates a high frequency component of a luminance signal in the predetermined area on the screen of the supplied non-3D image to estimate the scene structure thereof.

To achieve the above object, there is provided a pseudo 3D image creation method that creates depth estimation data from a non-3D image having depth information supplied neither explicitly nor, unlike a stereo image, implicitly for creating a pseudo 3D image from the depth estimation data and the non-3D image, the pseudo 3D image creation method comprising: a first step of calculating a statistical amount of pixel values in a predetermined area on a screen of the non-3D image, which is supplied, to estimate a scene structure; a second step of composing a plurality of basic depth models according to a composition ratio corresponding to a value calculated in the first step, the plurality of basic depth models indicating depth values of a plurality of basic scene structures, one for each; and a third step of creating the depth estimation data from the composition result composed by the second step and the supplied non-3D image.

In a preferred embodiment of the present invention, the first step calculates a high frequency component of a luminance signal in the predetermined area on the screen of the supplied non-3D image to estimate the scene structure thereof.

Unlike the so-called "shape from motion" method that performs depth estimation using motion information, the pseudo 3D image creation device and the creation method described above calculate the high frequency component or activity of the luminance signal in a predetermined area on the screen of a non-3D image having depth information supplied neither explicitly nor, unlike a stereo image, implicitly to estimate the depth structure of the scene. At this time, the depth structure of the estimated scene need not be accurate but is determined to such a degree that "the depth structure of the estimated scene structure of a type is to be selected because it is relatively similar to the real scene based on the rules of thumb". This is based on the so-called failsafe concept that, even if the judgment is wrong, the device and the method employ a depth structure that does not make a viewer feel extremely odd. The reason is that it is technically impossible to find the content from one non-3D image and to determine its detailed scene structure.

Although there is an unlimited number of actual scene structures, the present invention provides the user with a plurality of (for example, three) types of basic depth models indicating depth values that correspond, one to one, to a plurality of basic scene structures to prevent the user from feeling odd for any image and to allow the user to determine a scene structure that is as close to the real scene as possible. The composition ratio of those models is changed according to the calculation values of the high frequency component or activity of the luminance signal of the non-3D image in a predetermined area on the screen.

One of the advantages of using basic depth models is that expressing an actual three-dimensional scene, whose structure is actually complex, using a curved surface or a flat surface represented by relatively simple expressions makes it possible to process a visual extensity (a perspective effect) in a simple calculation that does not involve a motion estimation process or a vanishing point determination process.

For example, though the first basic depth model type that indicates a regular sphere concave surface is used as the base, the composition ratio is changed as follow. For example, the activity in the top part of the screen is low, the ratio of the second basic depth model type is increased to make the depth in the top part deeper, with the recognition that there is a sky or a flat wall in the top part of the screen. Conversely, when the activity in the bottom part of the screen is low, the ratio of the third basic depth model type is increased to make the screen in the top part approximately flat as a distant view and to make the depth shallower as it gets near the bottom of the screen, with the recognition that there is a flat ground or water extending continuously in the bottom part of the screen. In this way, the user can produce a depth scene structure that looks natural and as close to the real scene as possible for any image.

Although the three types of models given above are described in detail in "DESCRIPTION OF THE PREFERRED EMBODIMENTS", they are exemplary only. It is possible to use a model of some other shape or to use any number of models other than three. Although the mixture ratio of models is determined based on the calculation result of the activity in the top and bottom parts of the screen, the calculation need not always be executed for the area described above or for the activity of the luminance. The point of the present invention lies, not in what models are used, but in that models are used.

To achieve the above object, there is provided a pseudo 3D image display system comprising: the pseudo 3D image creation device according to claim 1 that creates depth estimation data from a non-3D image having depth information supplied neither explicitly nor, unlike a stereo image, implicitly to create a pseudo 3D image from the depth estimation data and the non-3D image; a multiple-viewpoint image creation device that generates a different-viewpoint image by shifting a texture of the non-3D image by an amount corresponding to the depth estimation data of a corresponding part based on the non-3D image supplied to the pseudo 3D image creation device and the depth estimation data output from the pseudo 3D image creation device; and a stereo display device for displaying one of the different-viewpoint image created by the multiple-viewpoint image creation device and the non-3D image as a left-eye image, and the other as a right-eye image.

In a preferred embodiment of the present invention, the multiple-viewpoint image creation device comprises: a texture shift unit that shifts the texture of the non-3D image by the amount corresponding to the depth estimation data of the corresponding part based on the non-3D image supplied to the pseudo 3D image creation device and the depth estimation data output from the pseudo 3D image creation device; an occlusion compensation unit that fills in an occlusion by using a corresponding part of an input image or by performing an occlusion compensation based on a statistical amount of a texture in an divided image, the occlusion being a part where no texture is present; a post processing unit that performs a post processing for a signal output from the occlusion compensation unit; and an output unit that outputs the different-viewpoint image, output from the post processing unit, as the left-eye image or as the right-eye image and outputs the non-3D image, supplied to the pseudo 3D image creation device, as the right-eye image or as the left-eye image.

As described above, the pseudo 3D image creation device and the pseudo 3D image creation method according to the present invention provide the user with a plurality of types of basic depth models indicating depth values that correspond, one to one, to a plurality of basic scene structures, and change the composition ratio of those models according to the calculation values of the high frequency component or activity of the luminance signal in a predetermined area on the screen. This allows the user to produce a scene structure that looks natural and as close to the real scene as possible from one non-3D image. Thus, based on the produced scene structure, the user can produce a natural-looking pseudo 3D image from any non-3D image.

The nature, principle and utility of the invention will become more apparent from the following detailed description when read in conjunction with the accompanying drawings.

DESCRIPTION OF THE PREFERRED EMBODIMENTS

Figure 1:
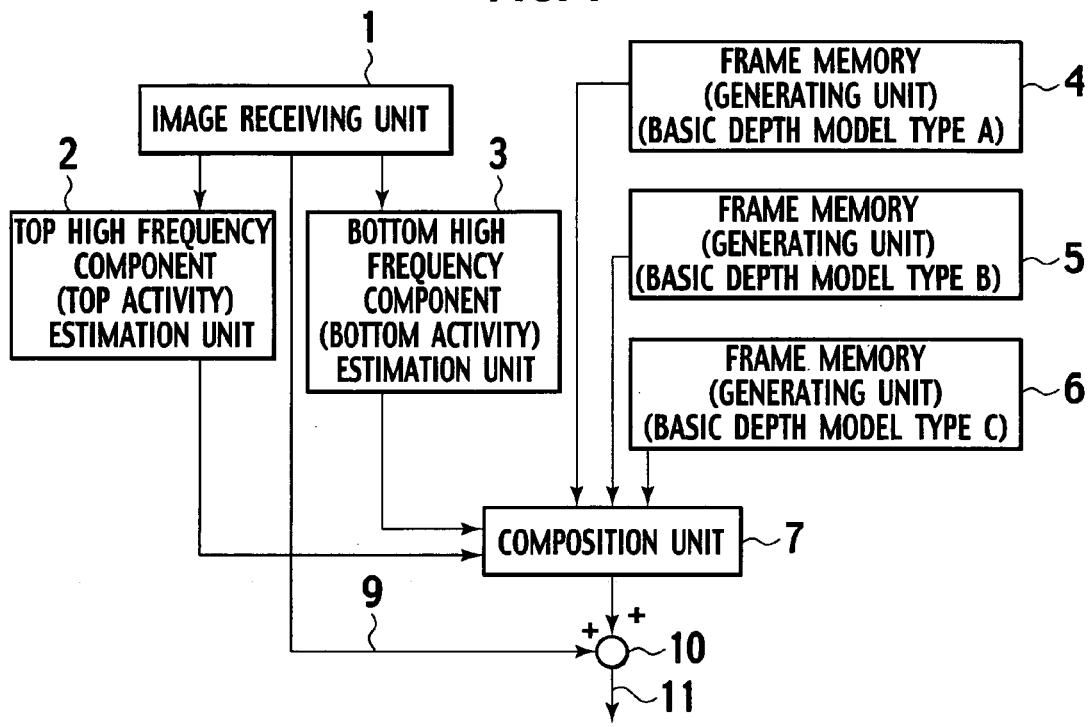
FIG. 1 is a block diagram showing one embodiment of a pseudo 3D image creation device according to the present invention.
Figure 2:
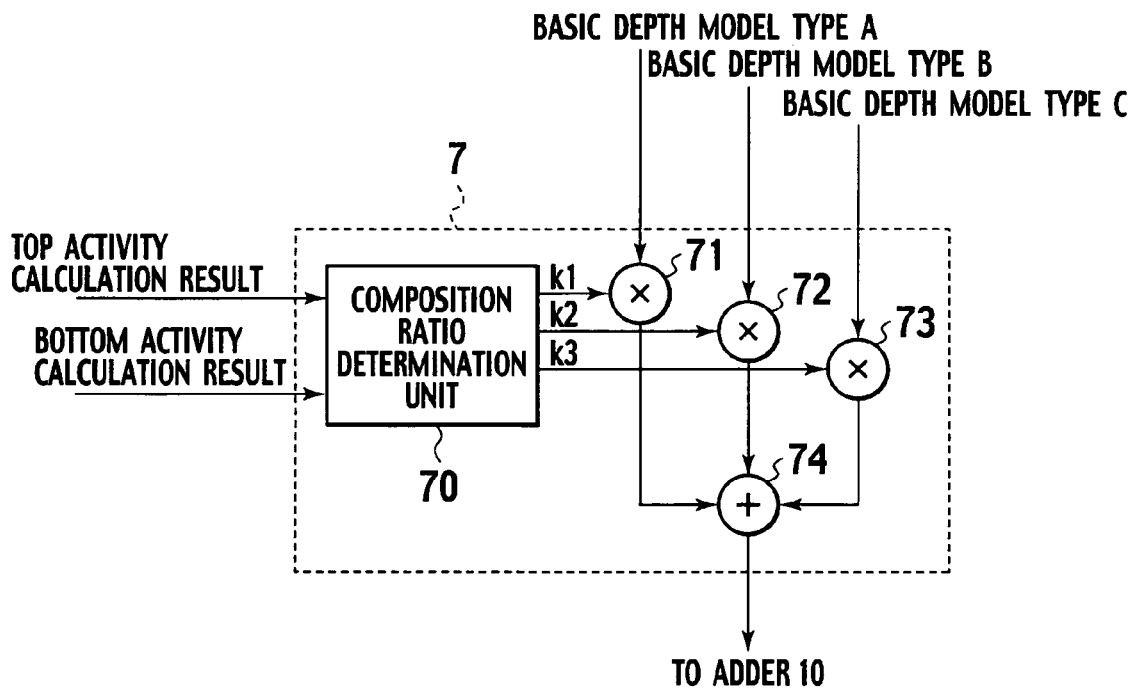
FIG. 2 is a block diagram showing one embodiment of a composition unit shown in FIG. 1.
Figure 3:
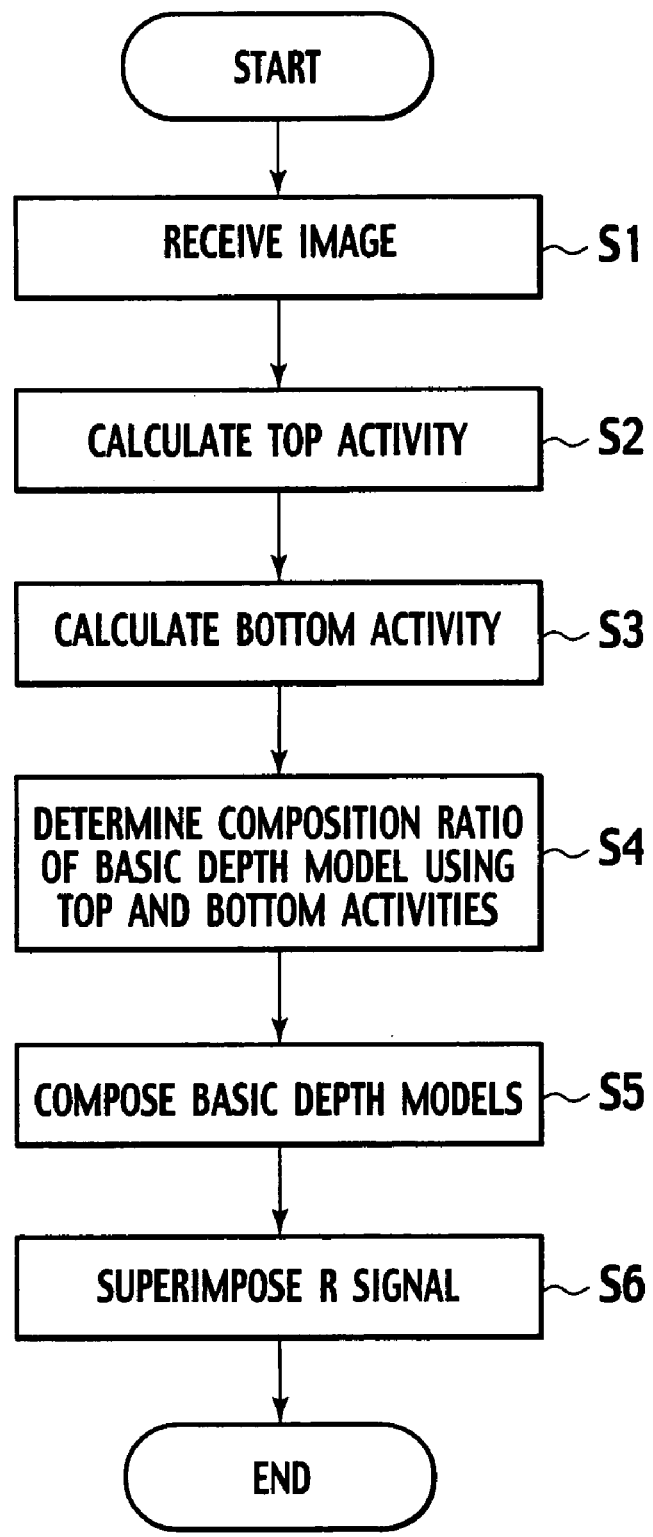
FIG. 3 is a flowchart showing one embodiment of a pseudo 3D image creation method according to the present invention.

An embodiment according to the present invention will be described below with reference to the drawings. FIG. 1 is a block diagram showing one embodiment of a pseudo 3D image creation device according to the present invention. FIG. 2 is a block diagram showing one embodiment of a composition unit shown in FIG. 1. FIG. 3 is a flowchart showing one embodiment of a pseudo 3D image creation method according to the present invention.

Referring to FIG. 1, the pseudo 3D image creation device in this embodiment comprises an image receiving unit 1 that receives a non-3D image to be converted to a pseudo 3D image; a top high frequency component estimation unit 2 that calculates "a high region component estimation value of about top 20% part (top high frequency component estimation value or top activity)" of a non-3D image received from the image receiving unit 1; a bottom high frequency component estimation unit 3 that calculates "a high region component estimation value of about bottom 20% part (bottom high frequency component estimation value or bottom activity)" of a non-3D image received from the image receiving unit 1; three frame memories 4, 5, and 6 in which a basic depth model type A, a basic depth model type B, and a basic depth model type C are stored respectively; a composition unit 7 that generates a composed model from three types of basic depth images read from the frame memories 4, 5, and 6 based on the composition ratio determined by the bottom high frequency component estimation value and the top high frequency component estimation value; and an adder 10 that superimposes a red color signal (R signal) 9, one of three primary color signals (RGB signals) of a base image received by the image receiving unit 1, onto a composed basic depth model image, obtained from the composition unit 7, to produce a final depth estimation data 11.

FIG. 2 shows the configuration of the composition unit 7 described above. It comprises a composition ratio determination unit 70 that uses a method that will be described later to determine the composition ratios k1, k2, and k3 (where, k2+k2+k3=1) of the models based on the bottom high frequency component estimation value and the top high frequency component estimation value; three multipliers 71, 72, and 73 each of which multiplies the composition ratio (k1, k2, k3) by the corresponding basic depth model type (model type A, model type B, model type C) to output the linear sum of each model according to the composition ratio (k1, k2, and k3); and an adder 74 that adds up the multiplication results of the multipliers 71, 72, and 73.

The basic depth model type A described above is a depth model that has the concave surface of a sphere. An image of this basic depth model type A is used except when the top high frequency component estimation value and the bottom high frequency component estimation value are extremely low. The basic depth model type B described above is similar to the basic depth model type A except that its top part is not a sphere but is replaced by an arch-shaped cylindrical surface. The basic depth model type B has a cylindrical surface (vertical axis) in its top part, and a concave surface (sphere) in the bottom part. The basic depth model type C described above is a model that has a flat surface (Z=1000−901=99) in the top part and a cylindrical surface, which continues from the flat surface and bends into the front direction as it gets near the bottom, in the bottom part. The basic depth model type C has a flat surface in the top part, and a cylindrical surface (horizontal axis) in the bottom part.

Next, the operation of the embodiment shown in FIG. 1 will be described with reference to the flowchart in FIG. 3. First, an image to be converted to a pseudo 3D image is received by the image receiving unit 1 (step S1). This image is a non-3D image that is a regular still image or moving image, that is, a non-3D image having depth information supplied neither explicitly nor, unlike a stereo image, implicitly. The data of this image is quantized in 8 bits. This input image has, for example, 720 horizontal pixels and 486 vertical pixels.

The image data of the non-3D image received by the image receiving unit 1 described above is supplied to the top high frequency component estimation unit 2 and, in this unit, about top 20% of the non-3D image is divided into blocks each composed of 8 horizontal pixels and 8 vertical pixels. Calculation is carried out for each block using the expression given below.

$$\sum_{i,j} (|Y(i, j) - Y(i+2, j)| + |Y(i, j) - Y(i, j+2)|)$$

where, Y(i, j) is the luminance signal at the point (i, j) in each block. The average of the values produced by this calculation for the blocks in about top 20% of the above image is a top high frequency component estimation value (a top activity) (step S2).

In parallel with the calculation of the activity described above, the image data of the non-3D image received by the image receiving unit 1 described above is supplied also to the bottom activity unit 3 and, in this unit, about bottom 20% of the non-3D image is divided into blocks each composed of 8 horizontal pixels and 8 vertical pixels. Calculation is carried out for each block using the same expression, where, Y(i, j) is the luminance signal at the point (i, j) in each block. The average of the values produced by this calculation for the blocks in about bottom 20% of the above image is a bottom high frequency component estimation value (a bottom activity) (step S3).

On the other hand, an image of the basic depth model type A derived from the expression below is stored in the frame memory 4, where the radius of the basic depth model type A that is a sphere (concave surface) model is r and the center of the image is the origin of coordinates x and y.

$$Z=\sqrt{r^2-x^2-y^2}-\sqrt{r^2-360^2-243^2}=\sqrt{1000^2-x^2-y^2}-901$$

In the example in which image data of 720 horizontal pixels and 486 vertical pixels is received by the image receiving unit 1, the radius r in the above expression is assumed to be r=1000 in units of pixels. In this specification, the depth Z is the value of z in the expression given below that indicates a sphere.

$$x^2+y^2+z^2=r^2$$

This is a value represented in multiples of the length of one side of a pixel, where the image is placed in the xy plane with the z-axis direction as the depth.

Figure 4:
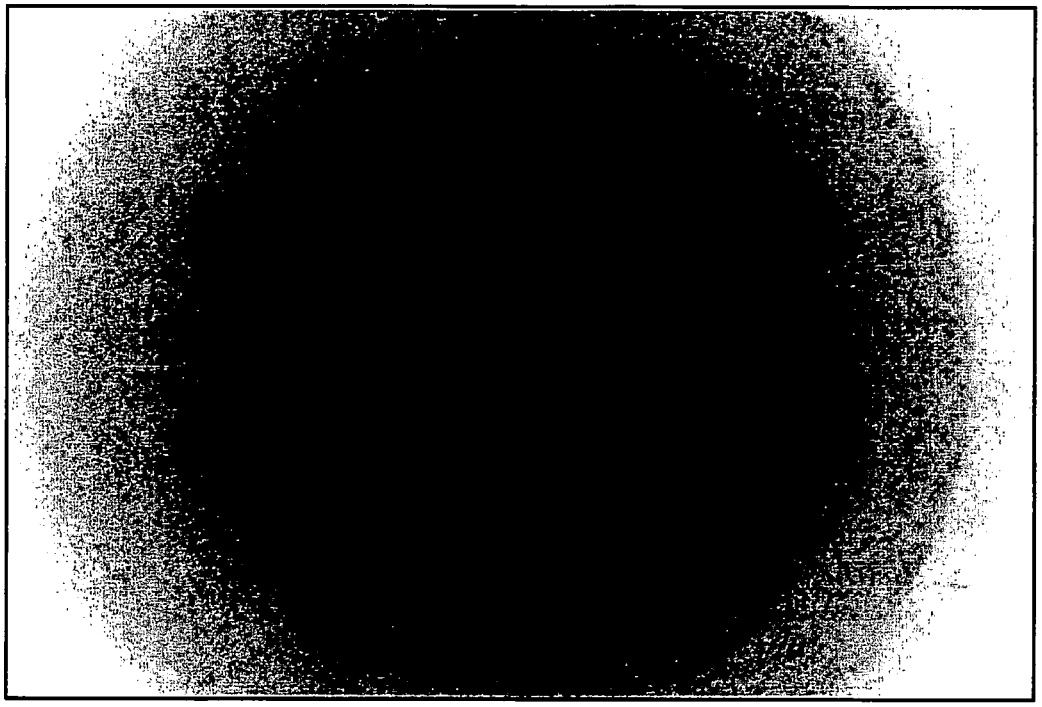
FIG. 4 is a diagram showing an example of a depth image of a basic depth model type A.
Figure 5:
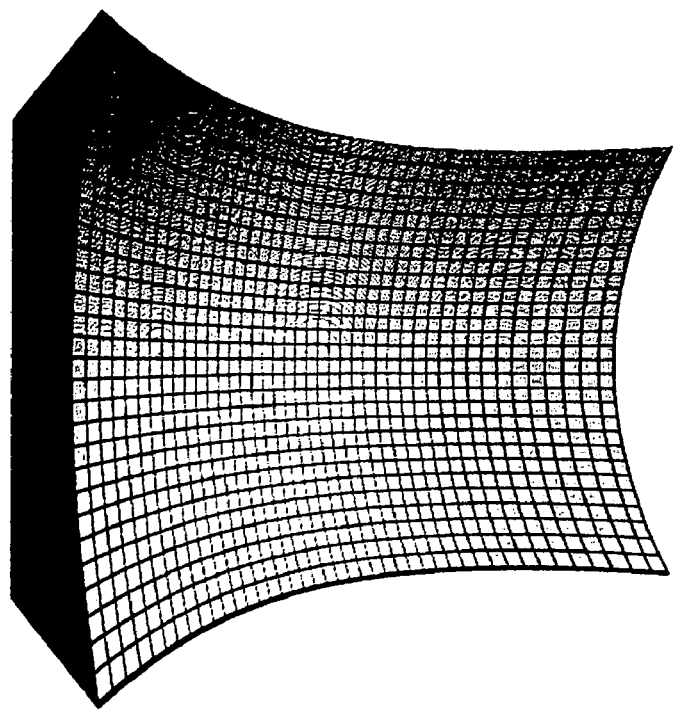
FIG. 5 is a diagram showing an example of the 3D structure of the basic depth model type A.
Figure 6:
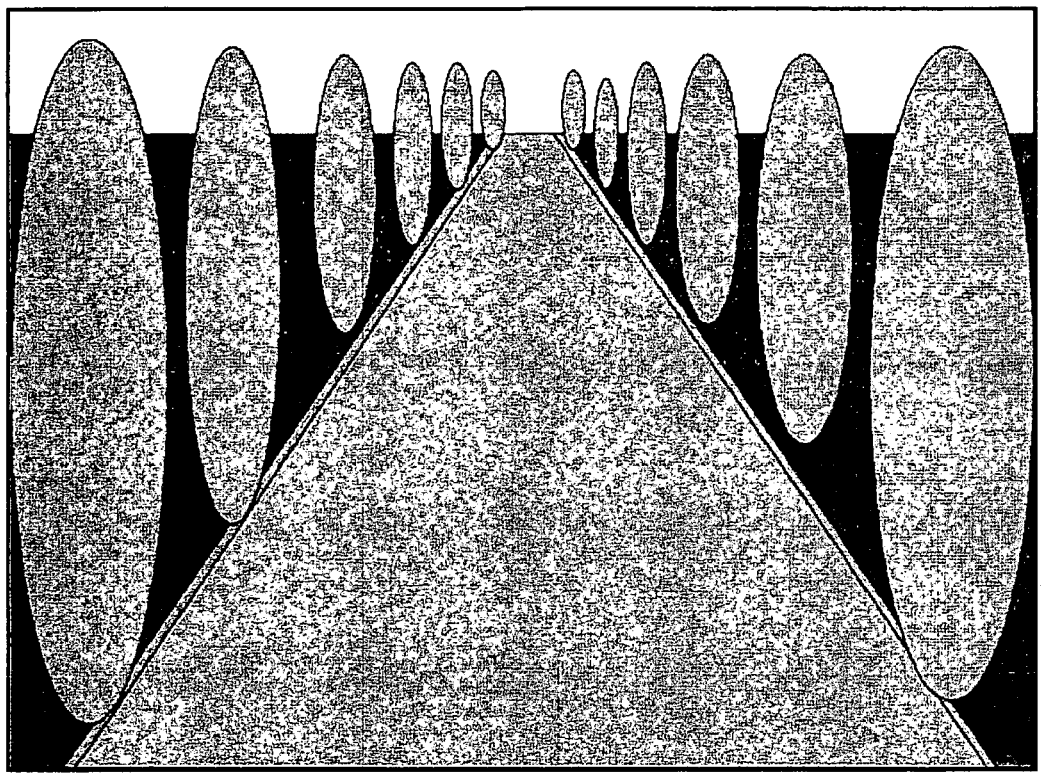
FIG. 6 is a diagram showing an example of the scene configuration in which the basic depth model type A is used.

FIG. 4 shows an example of a depth image of the basic depth model type A. FIG. 4 shows the concave surface of a regular sphere with the luminance of 255−2×Z indicating that the depth becomes shallower as the luminance increases. FIG. 5 shows the 3D structure of the basic depth model type A. The reason why the concave surface is used for this basic depth model type A is that, when there is no object in a scene, setting the center of the screen in the most distant position basically gives a natural cubic effect and a better perspective effect. FIG. 6 shows an example of a scene configuration for which the basic depth model type A is used.

The frame memory 5 stores therein an image of the basic depth model type B that is provided for a model whose the top part is a cylindrical surface (vertical axis) and whose bottom half is a concave surface (sphere) and that has the depth Z calculated by the following expression.

$$Z=\sqrt{r^2-x^2}-\sqrt{r^2-360^2-243^2}=\sqrt{1000^2-x^2}-901$$

Figure 7:
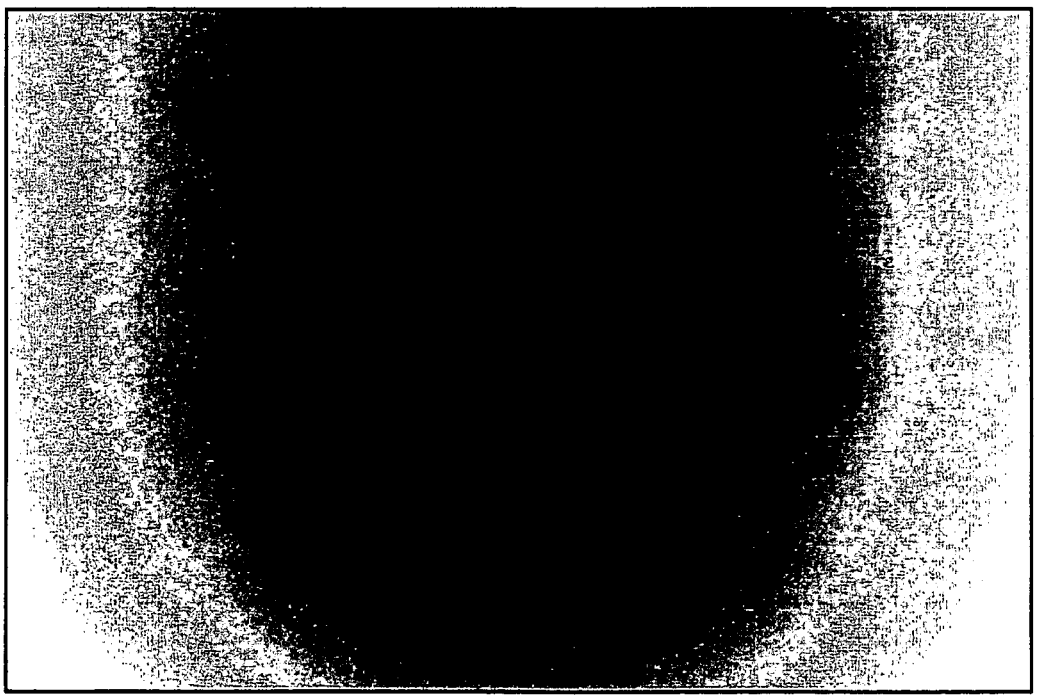
FIG. 7 is a diagram showing an example of a depth image of a basic depth model type B.
Figure 8:
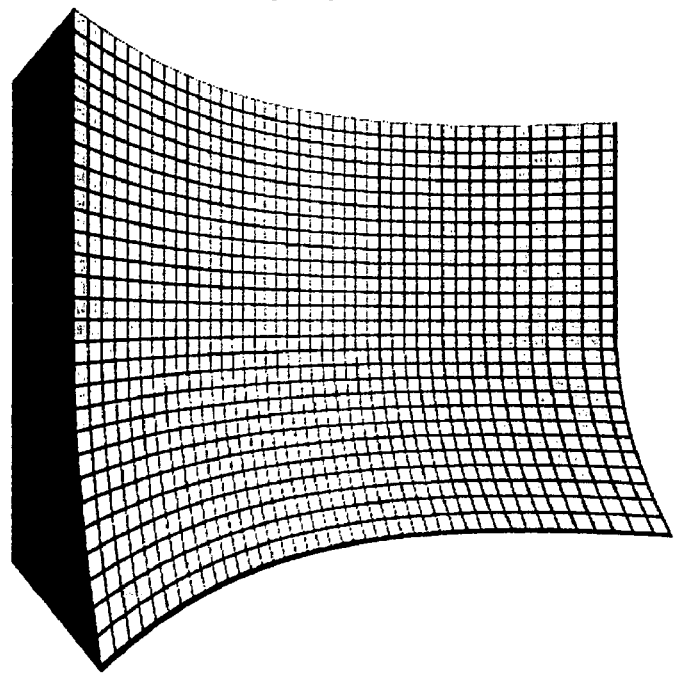
FIG. 8 is a diagram showing an example of the 3D structure of the basic depth model type B.

FIG. 7 shows a depth image of the basic depth model type B. FIG. 7 shows an image whose top half is a cylindrical concave surface and whose bottom half is a spherical concave surface. The luminance is converted by 255−2×Z as for an image of the basic depth model type A. FIG. 8 shows the 3D structure of the basic depth model type B.

Figure 9:
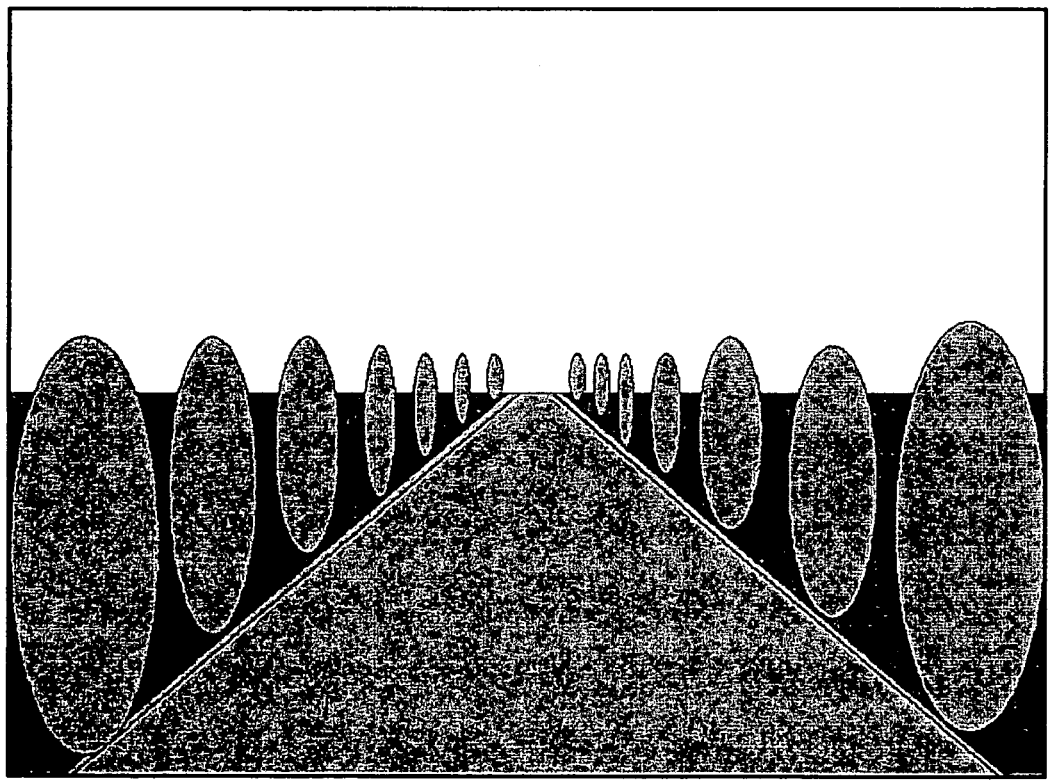
FIG. 9 is a diagram showing an example of the scene configuration in which the basic depth model type B is used.

The basic depth model type B is used to set a deep depth in the top part of the screen when the top high frequency component estimation value (top activity) is low, with the recognition that the scene has a sky or a flat wall in the top part of the screen. FIG. 9 shows a scene as an example of the scene configuration for which the basic depth model type B is used.

In addition, the frame memory 6 stores therein a an image that is provided for an image of the basic depth model type C whose the top part is a flat surface (Z=100−901=99) and whose bottom half continues from the flat surface and bends into the front direction as it gets near the bottom of the image and that has the depth Z calculated by the following expression.

$$Z=\sqrt{1000^2-y^2}-0.00035y^2-901$$

Figure 10:
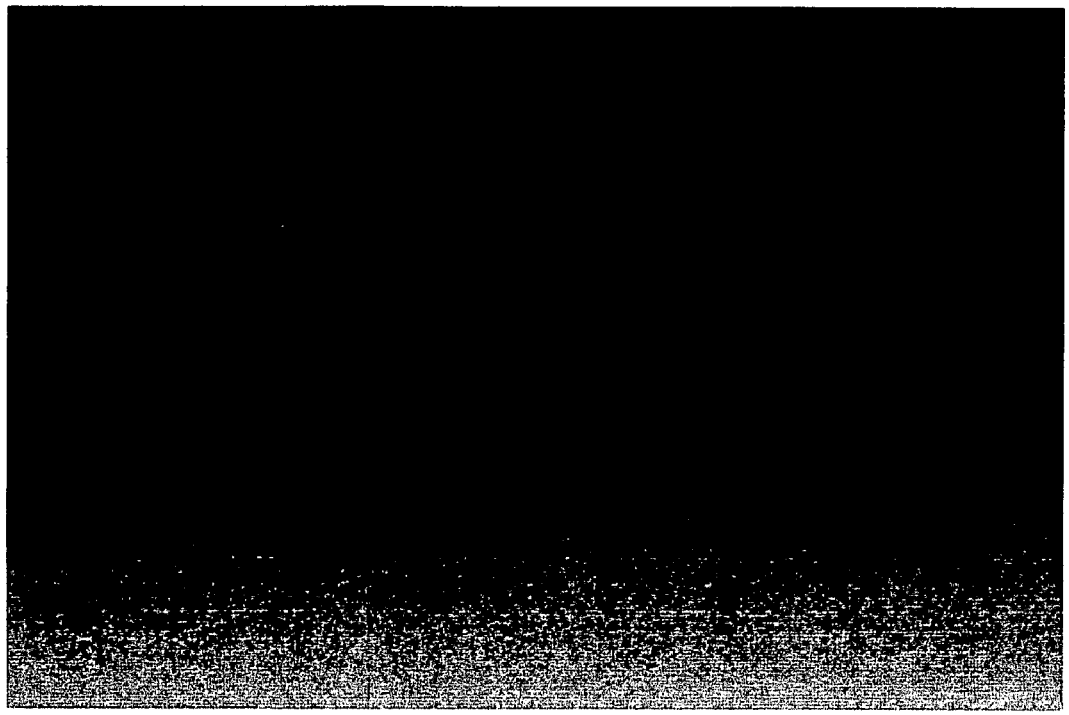
FIG. 10 is a diagram showing an example of a depth image of a basic depth model type C.
Figure 11:
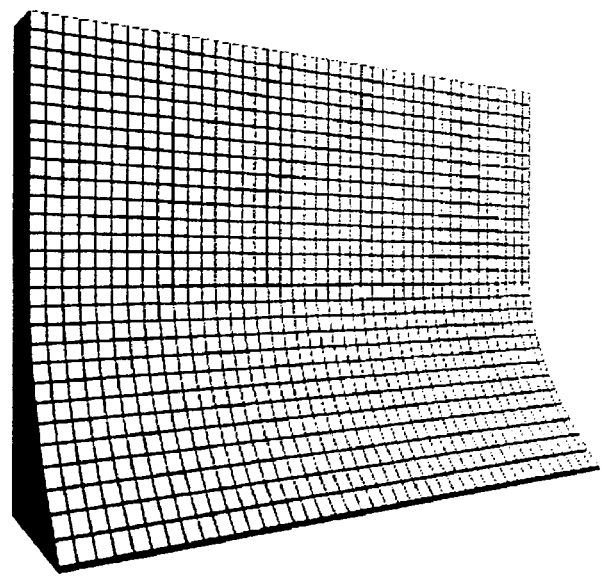
FIG. 11 is a diagram showing an example of the 3D structure of the basic depth model type C.

FIG. 10 shows a depth image of the basic depth model type C. FIG. 10 shows a graduation image whose top half is a flat surface and whose bottom half bends into the front direction as it gets near the bottom. The luminance is converted by 255−2×Z as for the two basic depth models described above, type A and type B. FIG. 11 shows the 3D structure of the basic depth model type C.

Figure 12:
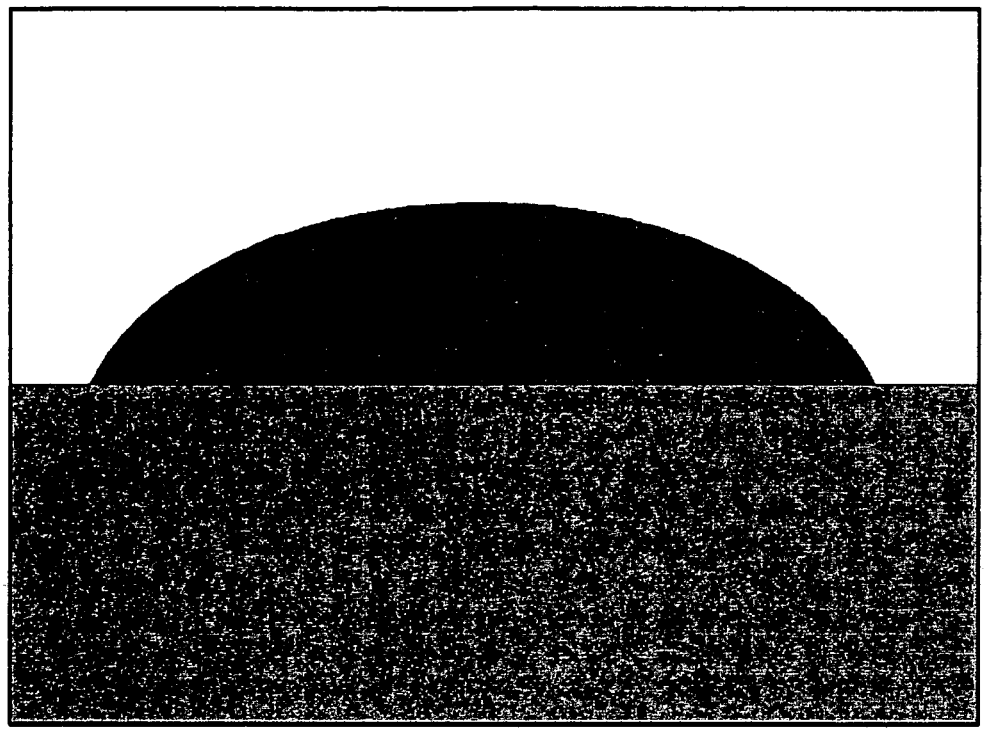
FIG. 12 is a diagram showing an example of the scene configuration in which the basic depth model type C is used.

The basic depth model type C is used, when the bottom high frequency component estimation value (bottom activity) is low, to make the screen top part approximately flat as a distant view and to make the depth Z smaller as it gets near the bottom in the bottom part of the screen, with the recognition that there is a flat ground or water in the bottom part of the screen. FIG. 12 shows a scene as an example of the scene configuration for which the basic depth model type C is used.

Each depth image of the three types of basic depth model types A, B, and C stored in the frame memories 4, 5, and 6 has a depth Z that is determined by the image size of an input image. The composition ratio is determined according to the top high frequency component estimation value (top activity) from the top activity unit 2 and the bottom high frequency component estimation value (bottom activity) from the bottom activity unit 3 (step S4). Then, based on the determined composition ratio, the composition unit 7 having the configuration shown in the configuration diagram in FIG. 2 generates a composed model from the depth images of the three types of basic depth model types A, B, and C stored in the frame memories 4, 5, and 6 (step S5). The composition unit 7 uses the method, which will be described later, to determine the composition ratios k1, k2, and k3 (where k1+k2+k3=1) of the models and outputs the linear sum of the models according to the ratios.

Additionally, though the respective depth images of the three types of basic depth model types A, B, and C are stored in the frame memories 4, 5, and 6 in the above description, they may be generated suitably by a computer or generating unit.

Figure 13:
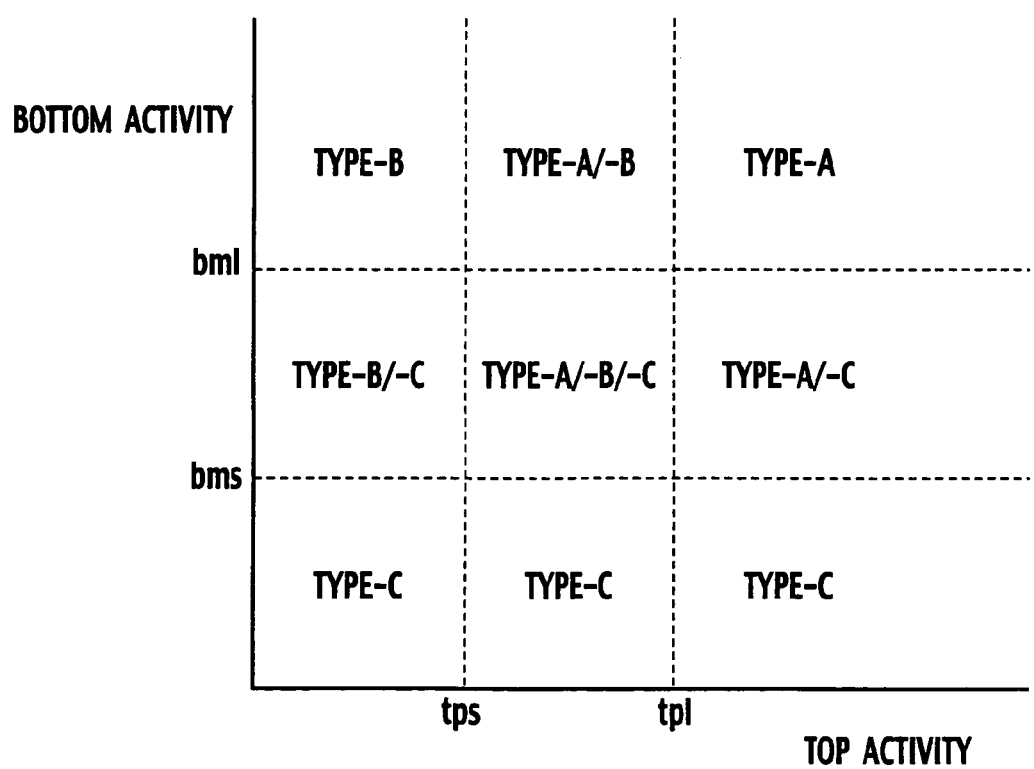
FIG. 13 is a diagram showing conditions for determining the composition ratio of basic depth models.

FIG. 13 shows an example of composition ratio determination conditions determined in step S5. FIG. 13 shows how basic depth model types are selected, or used for composition, in relation to the pre-specified values tps, tpl, bms, and bml, where the horizontal axis indicates the top activity and the vertical axis indicates the bottom activity. In the part in FIG. 13 where a plurality of basic depth model types are described, the ratio is linearly composed according to the high region component estimation values (activities).

For example, for Type-A/-B, the composition ratio between the basic depth model type A (Type-A) and the basic depth model type B (Type-B) is determined by the ratio of (top activity−tps):(tpl−top activity). That is, the composition ratio of Type-A/-B is determined by the expression without using the basic depth model type C (Type-C).

Type-$A$:Type-$B$:Type-$C$=(top activity−$tps$):($tpl$−top activity):0

For Type-B/-C and Type-A/-C, the composition ratio between the basic depth model type B and the basic depth model type C and the composition ratio between the basic depth model type A and the basic depth model type C are determined both by the ratio of (bottom activity−bms):(bml−bottom activity). That is, the composition ratio of Type-B/-C is determined by the following expression without using the basic depth model type A (Type-A)

Type-$A$:Type-$B$:Type $C$=0:(bottom activity−$bms$):($bml$−bottom activity)

and the composition ratio of Type-A/-C is determined by the expression without using the basic depth model type B (Type-B).

Type-$A$:Type-$B$:Type-$C$=(bottom activity−$bms$):0:($bml$−bottom activity)

In addition, for Type-A/-B/-C, the average of the composition ratios of Type-A/-B and Type-A/-C is used, and the composition ratio is determined by the following expression.

Type-$A$:Type-$B$:Type-$C$=(top activity−$tps$)+(bottom activity−$bms$):($tpl$−top activity):($bml$−bottom activity)

The composition ratios k1, k2, and k3 in FIG. 2 are represented by the following expressions.

$k1$=Type-$A$/(Type-$A$+Type-$B$+Type-$C$)

$k2$=Type-$B$/(Type-$A$+Type-$B$+Type-$C$)

$k3$=Type-$C$/(Type-$A$+Type-$B$+Type-$C$)

As described above, the three types of basic depth models are prepared in this embodiment as depth structure models for basic scenes, and the activity of the luminance signal of the basic image is calculated for the top part and bottom part of the screen. Although the basic depth model type A is used as the base, the composition ratio varies according to the scene. That is, when the activity in the top part of the screen is low, the ratio of the basic depth model type B is increased to make the depth in the top part deeper with the recognition that there is a sky or a flat wall in the top part. When the activity in the bottom part of the screen is low, the ratio of the basic depth model type C is increased to make the screen top part approximately flat as a distant view and to make the depth shallower as it gets near the bottom in the bottom part of the screen. Therefore, the method in this embodiment allows any image to be displayed naturally and, at the same time, determines the scene structure as close to the real structure as possible.

Returning to FIG. 1 and FIG. 3, the subsequent operation will be described. The composed basic depth model, which is produced by the composition unit 7 in FIG. 1 in step S5 in FIG. 3 as described above, is supplied to the adder 10. In the adder, the red signal (R signal) 9, one of three primary color signals (RGB signal) of the base non-3D image received from the image receiving unit 1, is superimposed on the model to produce the final depth estimation data 11 (step S6). In this example, 1/10 of the R signal of the original picture is superimposed.

One of the reasons for using the R signal is that, in an environment almost equivalent to the front-light environment and under a condition where the texture brightness does not change largely, the rules of thumb show that the intensity of the R signal matches the concavity and convexity of the object in many cases. Another reason is that the red color and a warm color, called an advancing color in chromatics, are characterized in that they make the depth to be recognized closer to the front than a cold color. The attribute that makes the depth to be recognized closer to the front makes it possible to enhance the cubic effect.

Figure 14:
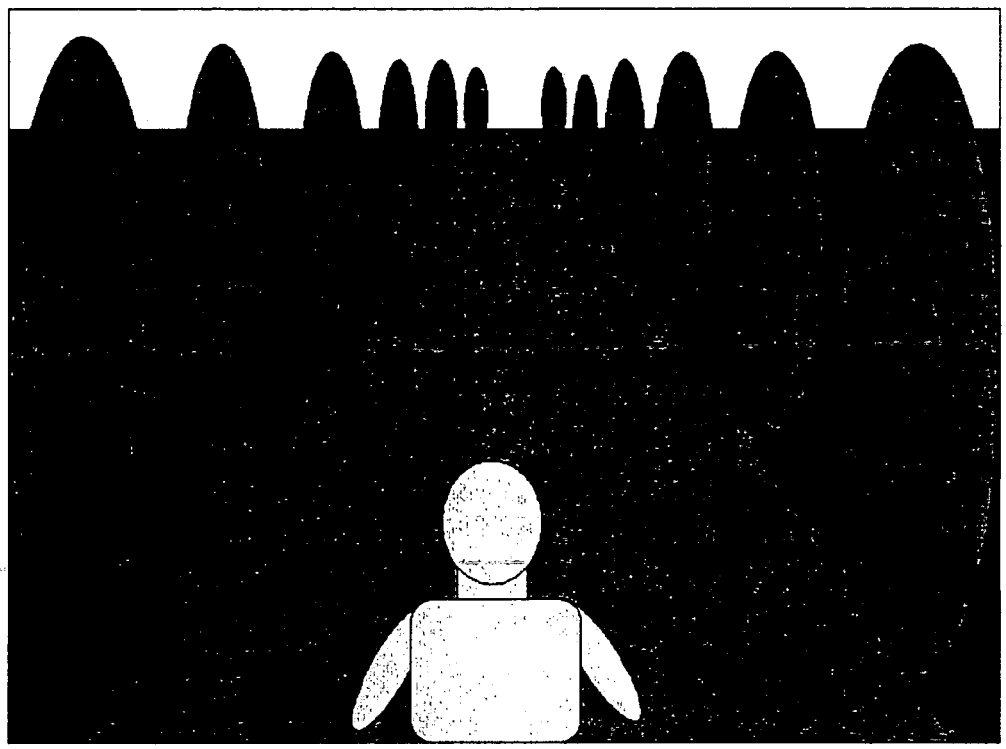
FIG. 14 is a diagram showing an example of an image sample.
Figure 15:
FIG. 15 is a diagram showing an example of a depth image on which the R signal is superimposed.
Figure 16:
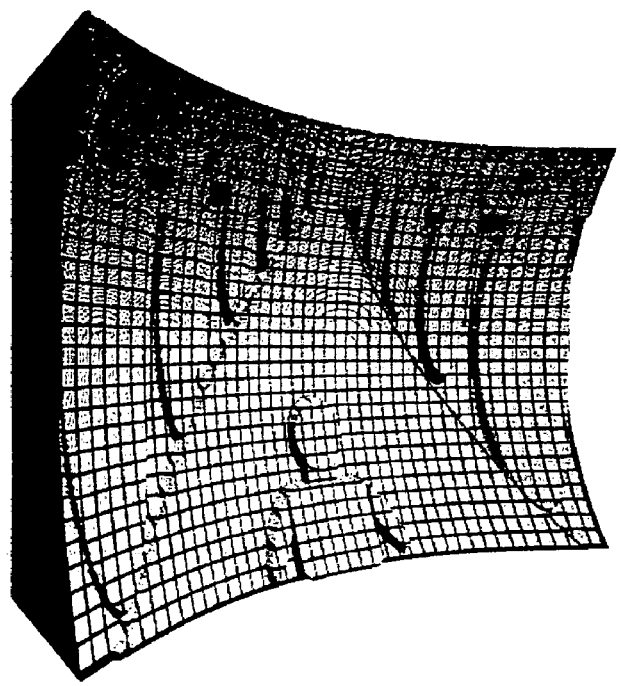
FIG. 16 is a diagram showing the 3D structure of a depth when the R signal is superimposed.

FIG. 14 shows a sample in which a person is placed in the front of the scene in FIG. 6 that shows an example of the basic depth model type A. FIG. 15 shows an example of an image of the depth estimation data 11 when the R signal is superimposed. FIG. 16 shows the three-dimensional structure. As shown in FIG. 15 and FIG. 16, the person or the line of trees where the R signal is relatively high look obviously protruded into the front direction.

On the other hand, while the red color and a warm color are advancing colors, the blue color is a receding color that makes the depth to be recognized in a more backward position than a warm color. Therefore, the cubic effect can also be enhanced by placing a blue part in the back. The cubic effect can also be enhanced by combining these two attributes, that is, by placing a red part in the front and a blue part in the back.

In addition, a different-viewpoint image can be generated based on the depth estimation data 11 described above. For example, when the viewpoint moves to the left, an object displayed in front of the screen is seen in the more inward side (nose side) of the viewer as the object is closer and, therefore, the texture of the corresponding part is moved to the inward, that is to the right, by the amount corresponding to the depth. An object displayed behind the screen is seen in the more outward side of the viewer as the object is closer and, therefore, the texture of the corresponding part is moved to the left by the amount corresponding to the depth. The stereo pair is configured by using the image created as described above as the left-eye image, and the original picture as the right-eye image.

Figure 17:
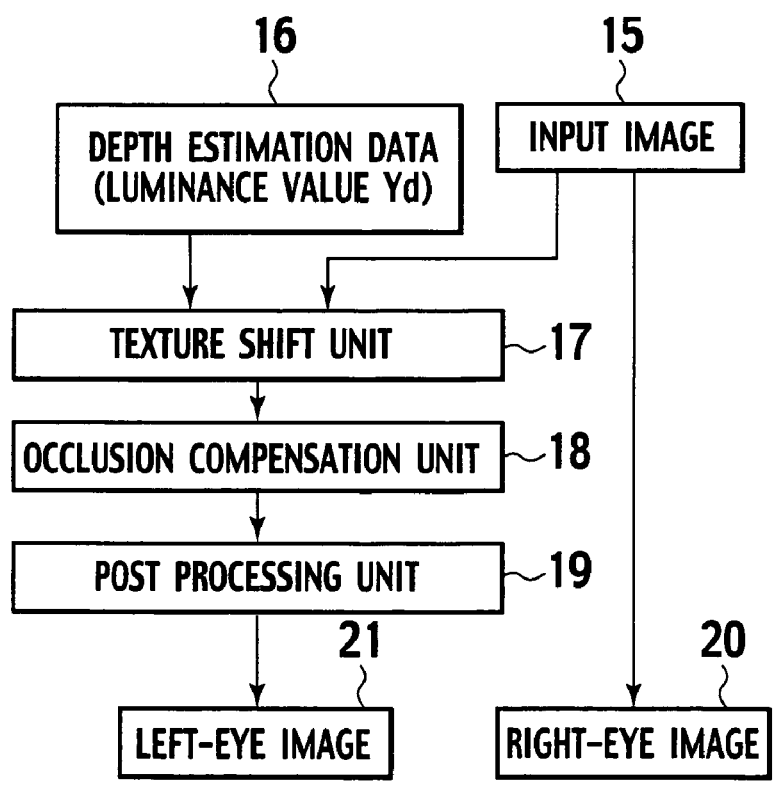
FIG. 17 is a block diagram showing one embodiment of a stereo pair generation device.

FIG. 17 shows a more actual procedure for generating a stereo pair. In this example, depth estimation data 16 corresponding to an input image 15 is represented by an 8-bit luminance value Yd. In ascending order of the luminance values Yd, that is, sequentially beginning with the one positioned in the back, a texture shift unit 17 shifts a part of the texture of the input image 15, which corresponds to the value, to the right by (Yd−m)/n pixels. In this case, m is depth data indicating the depth on the screen, and a part of the image with Yd larger than m is displayed in front of the screen and a part of the image with Yd lower than m is displayed in the back. n is a parameter for adjusting the depth representation. An example of the parameters is m=200 and n=20.

As a result of shifting, a part where no texture is present, that is, an occlusion, is sometimes generated depending upon a positional relation change in an image. To compensate for such a part, an occlusion compensation unit 18 is provided to fill in such a part with the corresponding part of the input image 15. Alternatively, the method described in the known document (Kunio Yamada, Kenji Mochizuki, Kiyoharu Aizawa, and Takahiro Saito: "Disocclusion Based on the Texture Statistics of the Image Segmented by the Region Competition Algorithm" The Journal of the Institute of Image Information and Television Engineers, Vol. 56, No. 5, pp. 863–866 (2002, 5)) can be used to fill in such a part.

A post processing unit 19 performs the known post processing such as smoothing for the image, for which occlusion compensation was performed by the occlusion compensation unit 18, to reduce the noises generated in the previous processing and generates the processed image as a left-eye image 21. This left-eye image 21 is combined with a right-eye image 20, which is the input image 15, to configure a stereo pair. The right-eye image 20 and the left-eye image 21 are output by output means.

Figure 18:
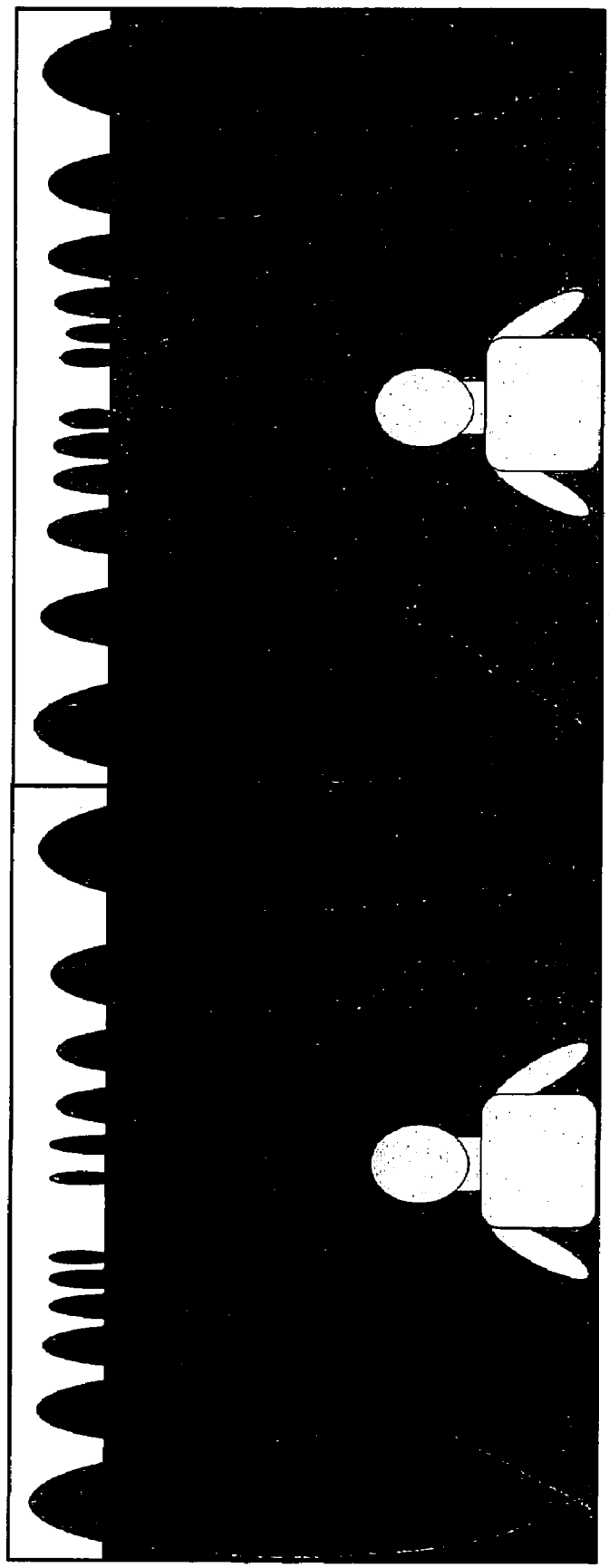
FIG. 18 is a diagram showing an example of a stereo pair generated as a pseudo 3D image.

FIG. 18 shows an example of a stereo pair generated by the procedure described above. Note that the stereo pair in this figure is generated with emphasis on the difference between the right and the left. Reversing the right with the left in the above example configures a stereo pair where the left-eye image is the original picture and the right-eye image is the generated different-viewpoint image.

Although the stereo pair is configured with the input image as the right-eye image and the generated different-viewpoint image as the left-eye image in the process described above, it is also possible to configure a stereo pair with the input image as the left-eye image and the generated different-viewpoint image as the right-eye image. In addition, it is also possible to use a different-viewpoint image for both the right and the left. That is, a stereo pair can be configured by using two different-viewpoint images; one generated by moving the viewpoint to the right and the other generated by moving the viewpoint to the left. In addition, when an image is displayed on a display device on which two or more viewpoints can be displayed, the different-viewpoint images can also be generated, one for each viewpoint.

Figure 19:
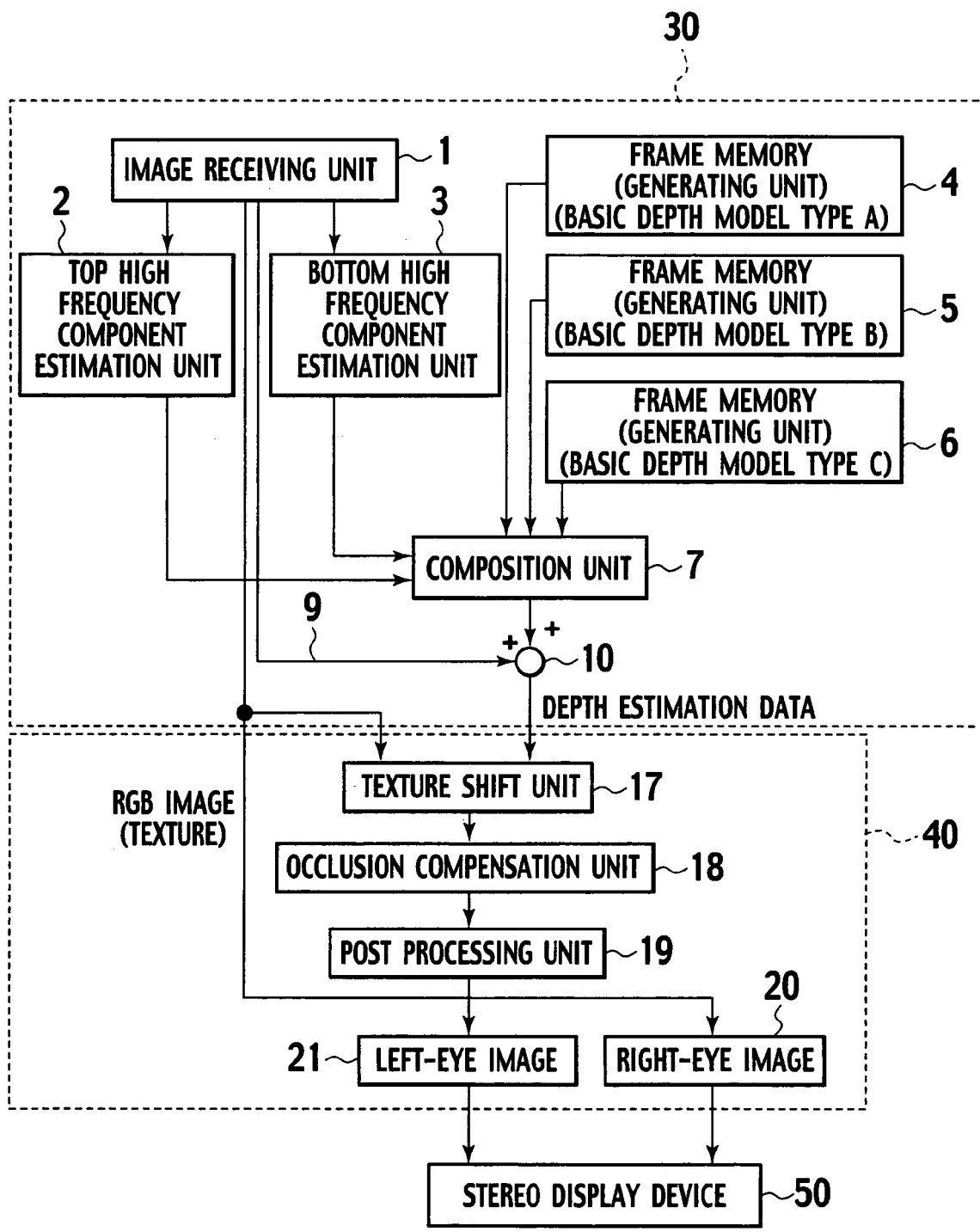
FIG. 19 is a block diagram showing one embodiment of a pseudo 3D image display system of the present invention.

By combining the depth estimation with the stereo pair generation method described above, a pseudo 3D image display system according to the present invention, such as the one shown in FIG. 19, can be configured to display a two-dimensional image as a 3D image. In the figure, the same reference numerals as those in FIG. 1 and FIG. 17 denote the same structural elements and their descriptions are omitted.

The pseudo 3D image display system shown in FIG. 19 has the configuration in which depth estimation data, which is a pseudo 3D image generated by a pseudo 3D image generation device 30 shown in FIG. 1, and a non-3D image, which is received by the image receiving unit 1, are supplied to the texture shift unit 17 of a stereo pair generation device 40 that has the configuration shown in FIG. 17. This configuration allows a stereo pair image (right-eye image 20 and left-eye image 21), generated by the stereo pair generation device 40, to be supplied to a stereo display device 50.

The stereo display device 50 described above comprises a projection system in which polarized glasses are used, a projection system or a display system in which a field sequential display and liquid-crystal shutter glasses are combined, a lenticular-mode stereo display, an anaglyph-mode stereo display, a head-mounted display, and so on. In particular, the device includes a projector system composed of two projectors each corresponding to an image of a stereo image. In addition, a multiple-viewpoint 3D video display system using a display device capable of displaying two or more viewpoints described above can also be built. The 3D display system may be equipped also with the voice output function. In this case, for a video content with no audio information such as a still image, an ambient sound suitable for a video may be added.

As described above, this embodiment determines a basic depth model based on the composition of three types of basic depth models and, according to the rules of thumb, generates an image that is relatively as close to the actual scene structure as possible. For a complex scene, the embodiment gives a viewer a cubic effect with particular emphasis on the sphere-based basic depth model type A, that is, with failsafe in mind. Because there is no significant fault in the left-eye image of an obtained stereo pair (pseudo 3D image) and the image looks almost natural as a 3D object, a depth model according to the scene content can be built from one image and, based on the depth model, a natural pseudo 3D image can be generated.

It should be noted that the present invention is not limited to the pseudo 3D image creation device with the hardware configuration shown in FIG. 1 but may be implemented as a computer program which executes the procedure shown in FIG. 3 to create a pseudo 3D image. In this case, the computer program can be read from a recording medium into a computer or may be downloaded into a computer via a network.

It should be understood that many modifications and adaptations of the invention will become apparent to those skilled in the art and it is intended to encompass such obvious modifications and changes in the scope of the claims appended hereto.

What is claimed is:

1. A pseudo 3D (three-dimensional) image creation device that creates depth estimation data from a non-3D image having depth information supplied neither explicitly nor, unlike a stereo image, implicitly for creating a pseudo 3D image from the depth estimation data and the non-3D image, said pseudo 3D image creation device comprising:

a generating unit that generates a plurality of basic depth models indicating depth values of a plurality of basic scene structures, one for each;

a calculation unit that calculates a statistical amount of pixel values in a predetermined area on a screen of the non-3D image, which is supplied, to estimate a scene structure;

a composition unit that composes said plurality of basic depth models, which are generated by said generating unit, according to a composition ratio corresponding to a value calculated by said calculation unit; and a creation unit that creates the depth estimation data from the composition result composed by said composition unit and the supplied non-3D image.

2. The pseudo 3D image creation device according to claim 1 wherein said calculation unit calculates a high frequency component of a luminance signal in the predetermined area on the screen of the supplied non-3D image to estimate the scene structure thereof.

3. A pseudo 3D image creation method that creates depth estimation data from a non-3D image having depth information supplied neither explicitly nor, unlike a stereo image, implicitly for creating a pseudo 3D image from the depth estimation data and the non-3D image, said pseudo 3D image creation method comprising:

a first step of calculating a statistical amount of pixel values in a predetermined area on a screen of the non-3D image, which is supplied, to estimate a scene structure;

a second step of composing a plurality of basic depth models according to a composition ratio corresponding to a value calculated in said first step, said plurality of basic depth models indicating depth values of a plurality of basic scene structures, one for each; and a third step of creating the depth estimation data from the composition result composed by said second step and the supplied non-3D image.

4. The pseudo 3D image creation method according to claim 3 wherein said first step calculates a high frequency component of a luminance signal in the predetermined area on the screen of the supplied non-3D image to estimate the scene structure thereof.

5. A pseudo 3D image display system comprising:

the pseudo 3D image creation device according to claim 1 that creates depth estimation data from a non-3D image having depth information supplied neither explicitly nor, unlike a stereo image, implicitly to create a pseudo 3D image from the depth estimation data and the non-3D image;

a multiple-viewpoint image creation device that generates a different-viewpoint image by shifting a texture of the non-3D image by an amount corresponding to the depth estimation data of a corresponding part based on the non-3D image supplied to said pseudo 3D image creation device and the depth estimation data output from said pseudo 3D image creation device; and a stereo display device that displays one of the different-viewpoint image created by said multiple-viewpoint image creation device and the non-3D image as a left-eye image, and the other as a right-eye image.

6. The pseudo 3D image display system according to claim 5 wherein said multiple-viewpoint image creation device comprises:

a texture shift unit that shifts the texture of the non-3D image by the amount corresponding to the depth estimation data of the corresponding part based on the non-3D image supplied to said pseudo 3D image creation device and the depth estimation data output from said pseudo 3D image creation device;

an occlusion compensation unit that fills in an occlusion by using a corresponding part of an input image or by performing an occlusion compensation based on a statistical amount of a texture in an divided image, said occlusion being a part where no texture is present;

a post processing unit that performs a post processing for a signal output from said occlusion compensation unit; and an output unit that outputs the different-viewpoint image, output from said post processing unit, as the left-eye image or as the right-eye image and outputs the non-3D image, supplied to said pseudo 3D image creation device, as the right-eye image or as the left-eye image.

* * * * *

UNITED STATES PATENT AND TRADEMARK OFFICE
CERTIFICATE OF CORRECTION

PATENT NO.        : 7,262,767 B2                                Page 1 of 1
APPLICATION NO.   : 11/176200
DATED             : August 28, 2007
INVENTOR(S)       : Yamada et al.

It is certified that error appears in the above-identified patent and that said Letters Patent is hereby corrected as shown below:

Column 1, Line 59,
Please delete "Kanada"
and
replace with
-- Kanade --

Column 2, Line 23,
Please delete "Kanada"
and
replace with
-- Kanade --

Column 6, Line 37,
Please delete "k2+k2+k3=1"
and
replace with
-- k1+k2+k3=1 --

Signed and Sealed this

Thirteenth Day of November, 2007

JON W. DUDAS
*Director of the United States Patent and Trademark Office*